United States Patent [19]

Ziebarth et al.

[11] Patent Number: 5,789,339
[45] Date of Patent: Aug. 4, 1998

[54] CATALYST FOR OXIDIZING OXYGEN-CONTAINING ORGANIC COMPOUNDS IN WASTE GAS

[75] Inventors: Michael S. Ziebarth, Columbia, Md.; Cristian Libanati, Washington, D.C.; Mohit Uberoi, Ellicott City, Md.

[73] Assignee: W. R. Grace & Co.-Conn., New York, N.Y.

[21] Appl. No.: 481,991

[22] Filed: Jun. 7, 1995

[51] Int. Cl.[6] .................................................. B01J 23/00
[52] U.S. Cl. .......................... 502/525; 502/303; 502/304; 502/324; 502/327; 502/328; 502/332; 502/335; 502/336
[58] Field of Search ............................ 502/525, 303, 502/328, 324, 304

[56] References Cited

U.S. PATENT DOCUMENTS

| | | | |
|---|---|---|---|
| 4,009,242 | 2/1977 | Lauder et al. | 423/213.2 |
| 4,055,513 | 10/1977 | Wheelock | 252/462 |
| 4,089,810 | 5/1978 | Diwell et al. | 252/462 |
| 4,126,580 | 11/1978 | Lauder | 252/462 |
| 4,136,063 | 1/1979 | Kimura et al. | 252/462 |
| 4,140,655 | 2/1979 | Chabot et al. | 252/462 |
| 4,151,123 | 4/1979 | McCann, III | 252/462 |
| 4,258,218 | 3/1981 | Dwyer et al. | 568/698 |
| 4,321,250 | 3/1982 | Hart | 423/652 |
| 4,337,028 | 6/1982 | Angwin et al. | 431/7 |
| 4,363,361 | 12/1982 | Madgavkar et al. | 166/256 |
| 4,451,578 | 5/1984 | Setzer et al. | 502/303 |
| 4,497,902 | 2/1985 | Bertolacini et al. | 502/65 |
| 4,522,940 | 6/1985 | Sambrook et al. | 502/328 |
| 4,849,398 | 7/1989 | Takada et al | 502/303 |
| 4,921,829 | 5/1990 | Ozawa et al. | 502/302 |
| 5,026,945 | 6/1991 | Campbell | 585/500 |
| 5,149,516 | 9/1992 | Han et al. | 423/415 A |
| 5,380,692 | 1/1995 | Nakatsuji et al. | 502/303 |
| 5,397,758 | 3/1995 | Bournetaubertot et al. | 502/303 |

FOREIGN PATENT DOCUMENTS

| | | | |
|---|---|---|---|
| 42 17 339 A1 | 12/1993 | Germany | B01J 23/68 |
| 4217339 | 12/1993 | Germany | B01J 23/68 |

OTHER PUBLICATIONS

Noritaka Mizuno et al., Preparation of Perovskite–type Mixed Oxide ($La_{1-x}Sr_xCoO_3$) Supported on Cordierite. Chemistry Letters, 1986, pp. 1333–1336.

Athanasios K. Ladavos et al., Structure and catalytic activity of perovskites La–Ni–O supported on alumina and zirconia. Applied Catalysis B: Environmental, 2 (1993) 27–47.

Collongue et al. Catalytic Combustion of Methane over Bulk and Supported $LaCrO_3$ Perovskites. Chem. Soc. Faraday Trans., 1991 87(15), 2493–2499.

H.M. Zhang et al., Preparation of Supported $La_{1-x}Sr_xMnO_3$ Catalysts by the Citrate Process. Applied Catalysis, 41 (1988) 137–146.

Patent Abstracts of Japan, vol. 16, No. 118 (C–0922), Mar. 25, 1992, Nissan Motors Co. Ltd.

Patent Abstracts of Japan, vol. 16, No. 383 (C–0974), Aug. 17, 1992, Matsushita Electric Inc. Co.

Derwent Publication AN 89–028647, Nissan Motor KK, Dec. 9, 1988.

*Primary Examiner*—Glenn Caldarola
*Assistant Examiner*—In Suk Bullock
*Attorney, Agent, or Firm*—Beverly J. Artale

[57] ABSTRACT

The present invention generally relates to supported perovskites and their use for low temperature oxidation of volatile oxygen-containing organic compounds, particularly alcohols. The present invention further relates to the use of supported perovskites to reduce the amount of oxygen-containing organic compounds present in waste gases produced by processes such as baking or brewing.

12 Claims, 6 Drawing Sheets

5,789,339

CATALYST FOR OXIDIZING OXYGEN-CONTAINING ORGANIC COMPOUNDS IN WASTE GAS

FIELD OF THE INVENTION

The present invention generally relates to supported perovskite catalysts and their use for low temperature oxidation of volatile oxygen-containing organic compounds, such as alcohols, esters and ethers. The present invention further relates to the use of supported perovskite catalysts to reduce the amount of oxygen-containing organic compound present in waste gases produced by processes such as fermentation, baking and brewing.

BACKGROUND OF THE INVENTION

Concerns over the release of various organic compounds into the atmosphere as components of waste gas has led to more and more stringent demands on industry to reduce emissions. The Environmental Protection Agency, for example, has recently enacted provisions concerning the amount of alcohol(s) which may be released into the atmosphere, such as ethanol and other alcohols released as components of the waste gases produced and/or released during fermenting processes.

Fermentation involves the metabolism of organic compounds by microorganisms. Compounds that are produced through fermentation include carboxylic acids such as lactic acid and alcohols such as ethanol. Molds, yeasts, bacteria and streptomycetes are all employed in fermentation processes.

Fermentation plays a role in the preparation and/or processing of many foodstuffs, including alcoholic beverages, such as beer and wine, vinegar, bakery products and the like. As a result, waste gases produced in such preparation and/or processing may include significant levels of volatile oxygen-containing organic compounds, such as alcohols, ethers, esters and carboxylic acids.

The brewing of beer, for example, includes the step of fermentation of a farinaceous extract obtained from a starchy raw material, barley, in the form of a malt. Other starchy raw materials that may be employed as the starting material are corn, rice, wheat, oats, potatoes and mixtures thereof.

The process for brewing beer involves mashing the malted barley with water, filtering off the solids and boiling the resultant filtrate (called a wort) with hops. The wort is then cooled and yeasts added.

During malting, enzymes, such as amylases, are released from the barley that transform the starchy raw material into fermentable sugars. These fermentable sugars are subsequently converted to ethanol and carbon dioxide by yeasts added to the wort. The beer is then processed and matured before marketing.

Bakery products include perishable foods, such as breads and cakes, and dry baked goods, such as cookies, crackers, pretzels, ice cream cones and the like. The total value of the entire baking industry in the United States exceeds $11,000,000,000.

Many bakery products tend to be highly perishable foods. Much of the production of these goods is therefore done in small plants distributed throughout the United States. From the plants, distribution of perishable bakery products is made within a relatively limited area, unless the product is first frozen to preserve its freshness for a longer distribution period. According to the 1977 Census of Manufactures, these small plants account for almost 750 of the total baking facilities in the United States.

Dry baked products, such as cookies, crackers and pretzels, have a relatively longer shelf life and can therefore be manufactured at a large central location and distributed over a wide area. According to the 1977 Census of Manufactures, there were 24 of these large facilities preparing dry baked products, with a combined output of $2,800,000,000.

Ingredients in bakery products, both perishable products and dry baked products, generally include the following: flour; leavening agents; sugar, such as corn syrups, sucrose and dextrose; fats and oils, such as animal fats and vegetable oils; milk; eggs; salt; and flavoring and enriching ingredients. Leavening agents may be loosely classified into two general categories: yeast, such as fresh compressed yeast or active dry yeast, and chemical leavening agents, such as baking powders. Yeast-raised products make up nearly two-thirds of the total dollar volume of the baking industry.

Most breads and other yeast-raised products are prepared by a sponge-dough process which has four basic steps. First, a sponge of flour, water, yeast and sugar is mixed and allowed to ferment. The sponge is then mixed with any additional ingredients, such as fats or milk, to develop the gluten in the dough. Alternatively, liquid sponges, which contain less flour, may be employed.

After a rest period, the dough is cut and shaped and allowed to rise. The leavening action of yeast is based upon its ability to break down the fermentable sugars in the dough, forming carbon dioxide and ethanol.

Once the dough has been allowed to rise, it is baked. During baking, the ethanol in the dough produced by the leavening action of the yeast is released to the atmosphere.

Malt vinegar is produced by surface or submerged-culture oxidation of malted barley, optionally mixed with one or more other grains. Amylases released from the malted barley convert the starches to fermentable sugars, such as glucose and maltose. These sugars are readily fermented by Saccharomyces yeast.

In addition to the above, there are a great number of other common processes that also involve release of volatile oxygen-containing organic compounds to the atmosphere. There is therefore a need in the industry for a catalyst and method which can efficiently reduce the level of alcohol and other volatile oxygen-containing organic compounds in waste gases.

SUMMARY OF THE INVENTION

Accordingly, the present invention is directed to a catalyst which can reduce the amount of oxygen-containing organic compounds in waste gas. The present invention is further catalyst and method for reducing the amount of oxygen-containing organic compounds in waste gas by oxidizing the compounds to carbon dioxide and water at low temperature.

Additional features and advantages of the invention will be set forth in the description which follows, and in part will be apparent from the description or may be learned from practice of the invention. The advantages of the invention will be realized and attained by the compositions and methods particularly pointed out in the written description and claims.

To achieve these and other advantages and in accordance with the purpose of the invention, as embodied and broadly described, the invention provides a catalyst for oxidizing oxygen-containing organic compounds in waste gas at low temperature which comprises a supported perovskite. The present invention also provides a method for reducing the amount of oxygen-containing organic compounds in waste gas which comprises contacting the waste gas with a catalyst comprising a supported perovskite at a temperature sufficient to oxidize the oxygen-containing organic compounds to carbon dioxide.

It is to be understood that both the foregoing general description and the following detailed description are exemplary and explanatory and are intended to provide further explanation of the invention as claimed.

DETAILED DESCRIPTION OF THE INVENTION

Figure 1:
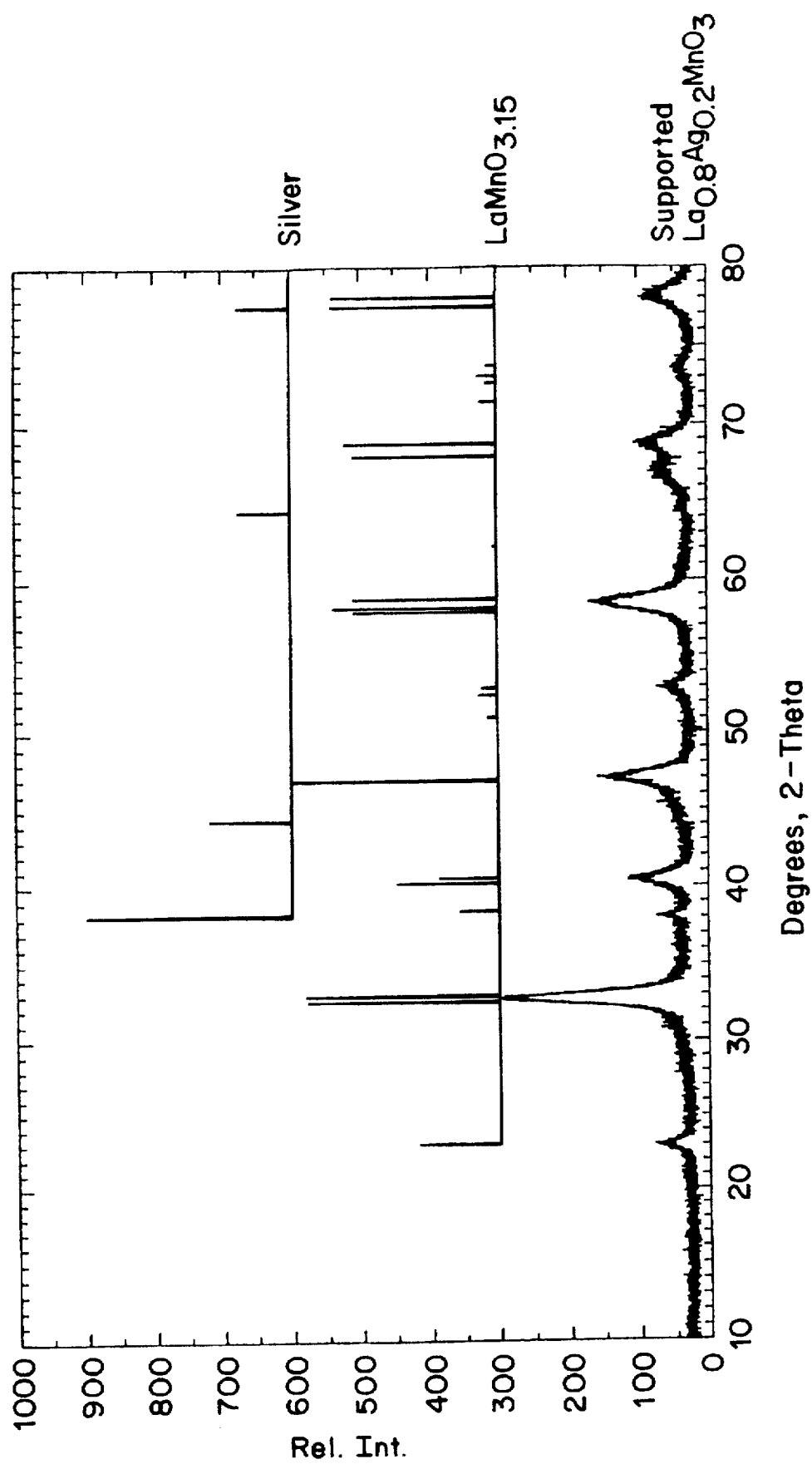
FIG. 1 shows the X-ray powder pattern for the supported perovskite of Example 1 and literature reference patterns for silver metal and $LaMnO_{3.15}$, a structurally similar perovskite.
Figure 2:
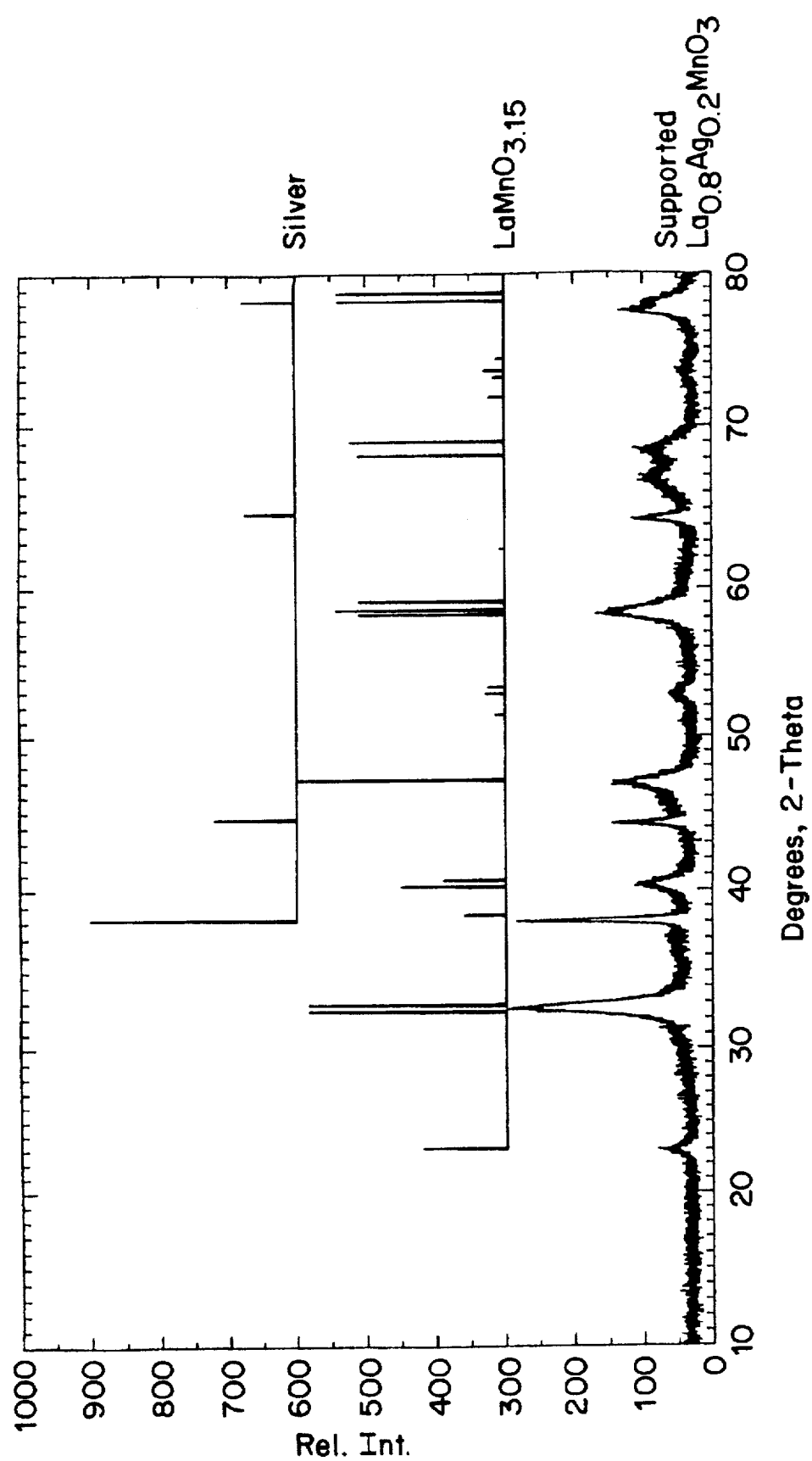
FIG. 2 shows the X-ray powder pattern for the supported perovskite of Example 2 and literature reference patterns for silver metal and $LaMnO_{3.15}$.
Figure 3:
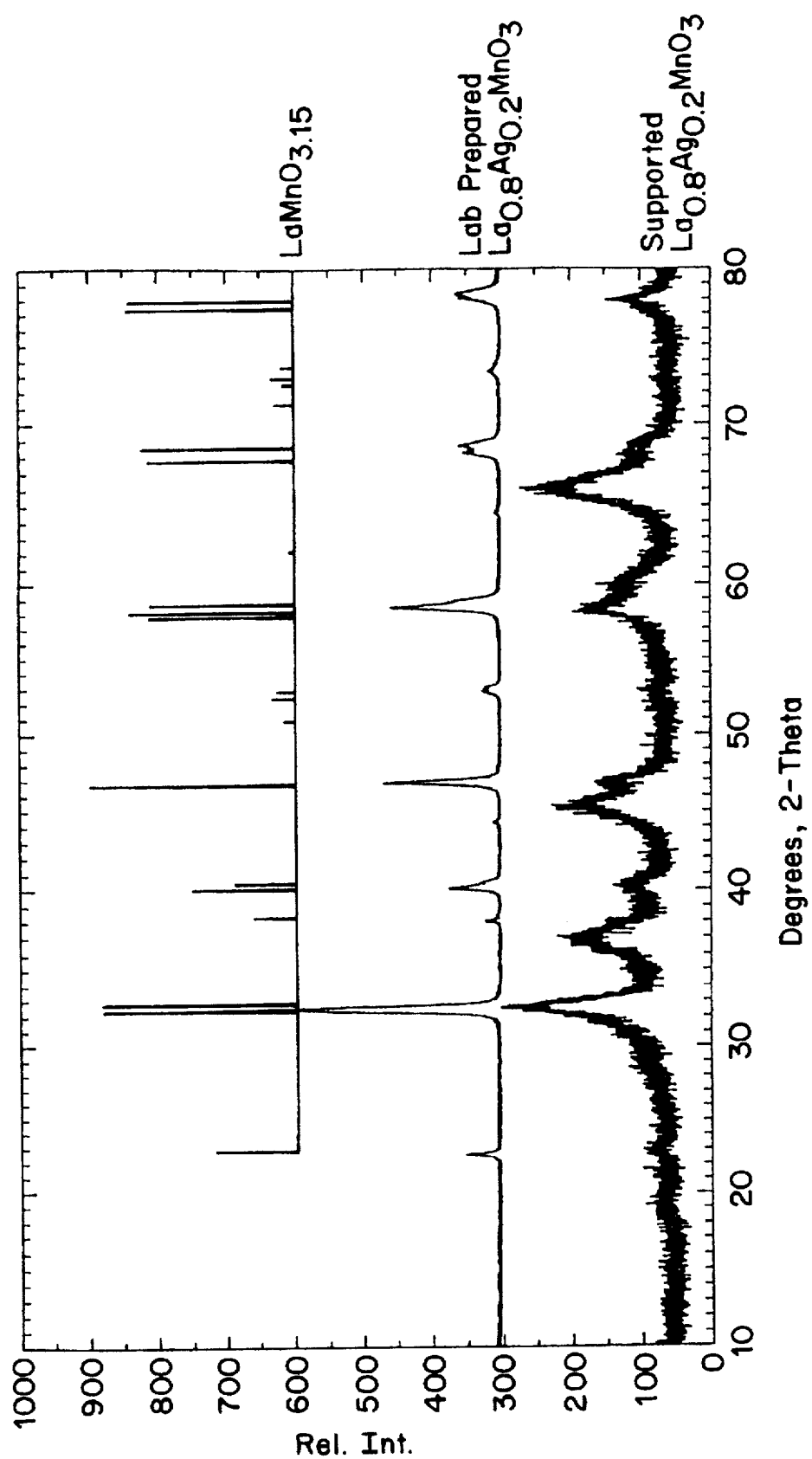
FIG. 3 shows the X-ray powder pattern for the supported perovskite of Example 3, the pattern for a laboratory preparation of pure $La_{0.8}Ag_{0.2}MnO_3$ perovskite, and a literature reference pattern for $LaMnO_{3.15}$.
Figure 4:
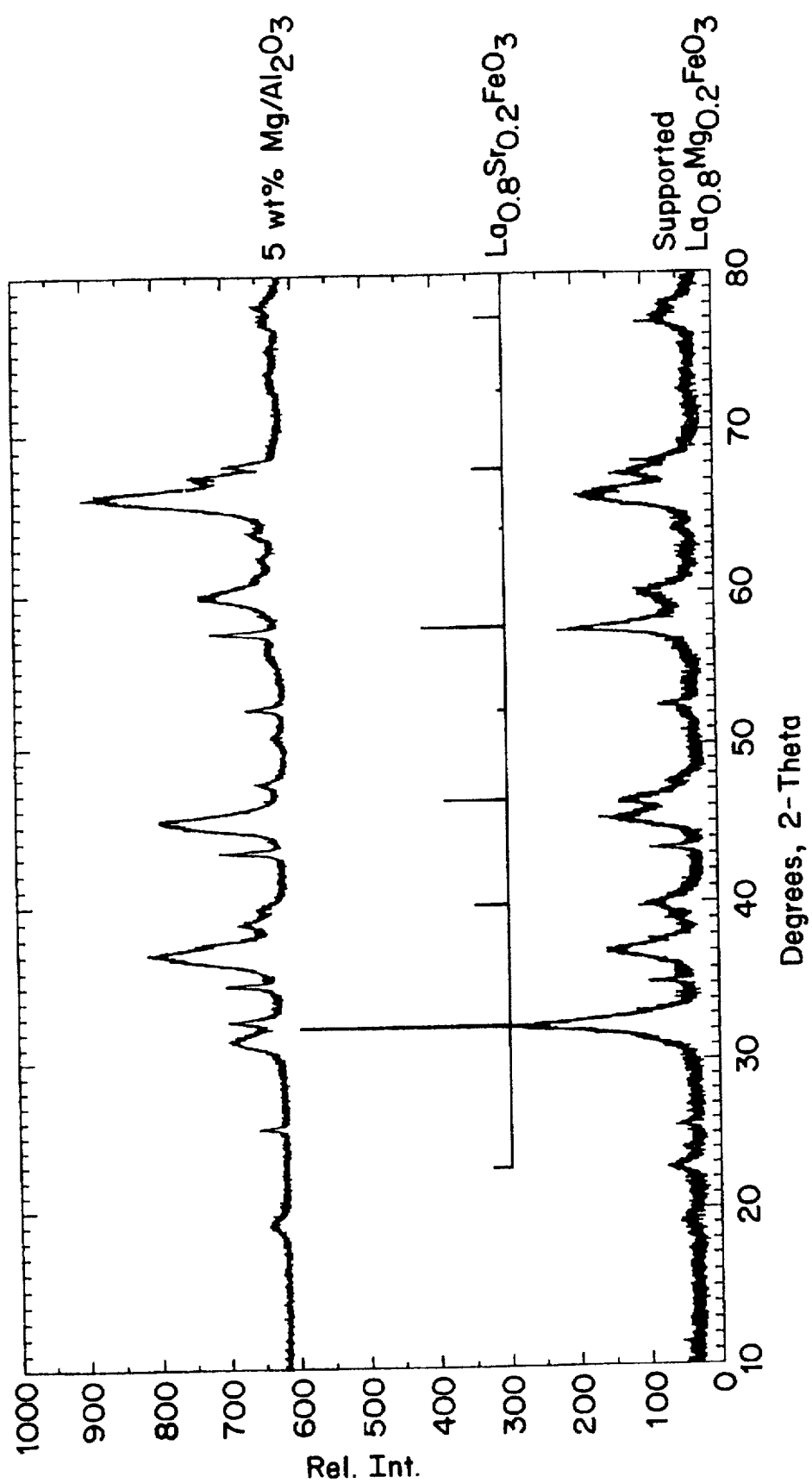
FIG. 4 shows the X-ray powder pattern for the supported perovskite of Example 4 and a literature reference pattern for $La_{0.8}Sr_{0.2}FeO_3$, a structurally similar perovskite.

A first embodiment of the present invention is directed to a catalyst for oxidizing oxygen-containing organic compounds in waste gas at low temperature which comprises a supported perovskite. As used herein, the term "perovskite" is intended to mean metal oxides having the ideal or non-ideal perovskite-type crystalline structure.

The ideal perovskite-type crystalline structure is based on the mineral perovskite ($CaTiO_3$) and is defined by the empirical formula $ABO_3$, in which A is a cation of a metal and is coordinated to twelve oxygen atoms and B is a cation of a different metal and is coordinated to six oxygen atoms. The algebraic sum of the ionic charges on cations A and B generally equals six.

The ideal perovskite-type crystalline structure is cubic, although few compounds possess this ideal structure. A more complete description of the perovskite-type crystalline structure may be found in A. F. Wells, Structural Inorganic Chemistry, 3d edition, 1962, pages 494–499, which is herein incorporated by reference.

The perovskite employed in the supported perovskite of the present invention may be any perovskite that has a sufficient catalytic activity to oxidize oxygen-containing organic compounds such as ethanol to carbon dioxide and water. Suitable perovskites are derived from perovskite precursors which contain cations having sufficient atomic radii and ionic charges to satisfy the requirements for perovskite formation. The requirements for perovskite formation are provided in F. Galasso, Structure, Properties and Preparation of Perovskite-Type Compounds, 1969, which is herein incorporated by reference.

Suitable perovskite precursor compounds include metals, metal oxides, metal hydroxides, metal nitrates and metal salts and mixtures thereof. The metals may have valences ranging from 1 to 5, such as silver, niobium, cesium, potassium, rubidium, barium, iron, lead, strontium, lanthanum, cobalt, aluminum and the like and mixtures thereof. The precursor compounds preferably include at least one transition metal component, i.e., at least one compound should contain an element selected from elements having atomic numbers 21 through 30, 39 through 48 and 57 through 80.

Preferably, the perovskite employed in the present invention is based on perovskites having the general formula $XYO_3$, where X is lanthanum, cerium or yttrium and Y is chromium, manganese, iron, cobalt or nickel. More preferably, X is lanthanum and Y is manganese.

In a particularly preferred embodiment of the present inventive catalyst, the perovskite is based on a modified $LaYO_3$ structure, in which some of the lanthanum ions have been replaced by ions of a different metal, such as silver (Ag). These perovskites have the formula $La_{1-x}A_xYO_3$, where x is preferably at least 0.1 and not more than 0.75, A is the metal replacing lanthanum, and Y is as defined above. Preferably, A is silver or magnesium and Y is manganese or iron.

The metal oxide support may be any metal oxide suitable for the intended application of the inventive catalyst. Preferably, the metal oxide support is a porous metal oxide. The surface area of suitable porous metal oxides is generally in the range of 50 $m^2/g$ to 250 $m^2/g$. Illustrative examples of suitable porous metal oxides include aluminum oxides ($Al_2O_3$), magnesium oxides (MgO), titanium oxides ($TiO_2$), zirconium oxides ($ZrO_2$) or mixtures of two or more of these oxides. More preferably, the porous metal oxide support is an aluminum oxide, most preferably alumina.

The metal oxide support may be in any form suitable for the intended application of the inventive supported perovskite. Illustrative examples of suitable forms include beads, powders (such as spray-dried powders), slurries, gels, monoliths, wash coats and extrudates. Preferably, the metal oxide support is in the form of beads or extrudates. Most preferably, the metal oxide support is porous alumina beads, between 1/20" and 1/4" in diameter, with a BET surface area of 50–200 $m^2/g$ and a pore volume of greater than 0.3 cc/g.

To form the supported perovskite of the present invention, perovskite precursors are impregnated and/or deposited in and/or on the surface of the support. The resulting material is then calcined for a suitable time at a suitable temperature to form a perovskite on the metal oxide support. The material is generally calcined at a temperature of at least 400° C., preferably ranging from 600° C. to 850° C., for about 3 to 8 hours.

The supported perovskite may also include other suitable catalytic materials, such as one or more noble metals or mixtures thereof. In such an embodiment, the supported perovskite may be impregnated with an effective amount (e.g. a few parts per million up to 1%) of a noble metal such as platinum or palladium followed by calcination at a suitable temperature. Alternatively, a noble metal may be co-impregnated or co-deposited with the perovskite precursors followed by calcination.

In a particularly preferred embodiment of the present invention, the metal oxide support is a stabilized metal oxide support. In such a preferred embodiment, the supported perovskite may be prepared by first forming a partial or complete metal oxide layer on the surface of the metal oxide support, which stabilizes the metal oxide support, and then forming the perovskite on the surface of the stabilized metal oxide support.

To form the stabilized support, the metal oxide support is preferably treated with a compound containing a metal component such that metal ions from the metal component are impregnated in the metal oxide. More preferably, the metal oxide support is treated with a solution of the compound containing the desired metal component to impregnate or deposit the metal component on the surface of the metal oxide support.

The thus-treated metal oxide support is then calcined for a suitable time at a suitable temperature to form an oxide of the metal component on the surface of the metal oxide support and stabilize the support. Preferably, the thus-treated metal oxide support is calcined at a temperature ranging from 500° C. to 1000° C. for 1 to 5 hours.

The compound containing the metal component may be any compound which has cations that will form an oxide coating on the surface of the metal oxide support. Illustrative examples of suitable metal components include magnesium, iron, cobalt, nickel, manganese, zinc, titanium, copper, chromium, lanthanum, barium, calcium, strontium and silver. Illustrative examples of suitable compounds include pure metals, metal oxides, metal hydroxides, metal nitrates and metal salts.

Once the metal oxide support has been stabilized by forming the oxide of the metal component on its surface, a perovskite layer is then formed on the stabilized metal oxide support to produce the inventive supported perovskite. The perovskite layer is preferably formed by impregnating or depositing perovskite precursors on the surface of the stabilized support. The resulting material is then calcined for a suitable time at a suitable temperature to form a perovskite on the stabilized support. Preferably, the material is calcined at a temperature of at least 400° C., generally ranging from 600° C. to 850° C., for about 3 to 8 hours.

In a particularly preferred embodiment of the present invention, the perovskite on the stabilized support has the formula $La_{1-x}A_xYO_3$, where x is preferably at least 0.1 and not more than 0.75 and A and Y are as defined above. This perovskite is preferably prepared by treating the stabilized metal oxide support with aqueous nitrate solutions containing the correct stoichiometric ratio of lanthanum and the desired additional metal ions, such as silver, magnesium, iron and manganese. The thus-treated stabilized metal oxide support is then dried and calcined to form the desired supported perovskite. If appropriate, the thus-treated stabilized metal oxide support may be dried and heated to remove residual nitrates prior to calcining to form the perovskite.

The supported perovskite of the present invention may be used to oxidize volatile oxygen-containing organic compounds, such as alcohols, esters and carboxylic acids, to carbon dioxide and water at low temperatures, for example, below 550° F. Preferably, the supported perovskite may be used to oxidize oxygen-containing organic compounds such as ethanol in waste gases from bakeries or breweries or the like, thereby reducing the levels of oxygen-containing organic compounds in the waste gas. In such a preferred embodiment, the waste gas is contacted with the supported perovskite for a sufficient time at a sufficient temperature to oxidize oxygen-containing organic compounds in the waste gas, most preferably to carbon dioxide and water.

The following examples of the inventive composition are merely illustrative of the invention and should not be construed as limiting. One skilled in the art can make, without undue experimentation, various substitutions and variations and by equivalent means, performing in substantially the same manner, obtain substantially the same results without departing from the teaching and spirit of the invention.

EXAMPLE 1

Preparation of $La_{0.8}Ag_{0.2}MnO_3$ supported on $La/Al_2O_3$.

25 g of γ-alumina beads were impregnated to 10 wt% La using lanthanum nitrate. The material was then dried and calcined at 800° C. for 2 hours. The lanthanum stabilized alumina was impregnated three times with a solution containing 6.9 g $La(NO_3)_3 \cdot 6H_2O$, 0.68 g $AgNO_3$ and 3.6 g $Mn(NO_3)_2$. The resultant material was dried and calcined at 800° C. for 5–8 hours following each impregnation to form the supported $La_{0.8}AgO_{0.2}MnO_3$. The formation of a perovskite phase on the alumina was substantiated by x-ray powder diffraction. The supported $La_{0.8}Ag_{0.2}MnO_3$ contained 30 wt% of the perovskite and had a surface area of 85 m²/g.

EXAMPLE 2

Preparation of $La_{0.8}Ag_{0.2}MnO_3$ supported on $Ag/Al_2O_3$.

25 g of γ-alumina beads were impregnated to 8 wt% Ag using silver nitrate. The material was then dried and calcined at 800° C. for 2 hours. The silver stabilized alumina was impregnated three times with a solution containing 6.9 g $La(NO_3)_3 \cdot 6H_2O$, 0.68 g $AgNO_3$ and 3.6 g $Mn(NO_3)_2$. The resultant material was dried and calcined at 800° C. for 5–8 hours following each impregnation to form the supported $La_{0.8}Ag_{0.2}MnO_3$. The formation of a perovskite phase on the alumina was substantiated by x-ray powder diffraction. The supported $La_{0.8}Ag_{0.2}MnO_3$ contained 30 wt% of the perovskite and had a surface area of 85 m²/g.

EXAMPLE 3

Preparation of $La_{0.8}Ag_{0.2}MnO_3$ supported on $Mg/Al_2O_3$.

25 g of γ-alumina beads were impregnated to 5 wt% Mg using magnesium nitrate. The material was then dried and calcined at 800° C. for 2 hours. The magnesium stabilized alumina was impregnated twice with a solution containing 6.9 g $La(NO_3)_3 \cdot 6H_2O$, 0.68 g $AgNO_3$ and 3.6 g $Mn(NO_3)_2$. The resultant material was dried and calcined at 500° C. for 2 hours following the first impregnation (to remove residual nitrates) and then calcined following the second impregnation at 800° C. for 5 hours to form the supported $La_{0.8}Ag_{0.2}MnO_3$. The formation of a perovskite phase on the alumina was substantiated by x-ray powder diffraction. The supported $La_{0.8}Ag_{0.2}MnO_3$ contained 20 wt % of the perovskite and had a surface area of 125 m²/g.

EXAMPLE 4

Preparation of $La_{0.8}Mg_{0.2}FeO_3$ supported on $Mg/Al_2O_3$.

25 g of γ-alumina beads were impregnated to 5 wt % Mg using magnesium nitrate. The material was then dried and calcined at 800° C. for 2 hours. The magnesium stabilized alumina was impregnated twice with a solution containing 3.5 g $La(NO_3)_3 \cdot 6H_2O$, 0.52 g $Mg(NO_3)_2 \cdot 6H_2O$ and 4.1 g $Fe(NO_3)_3 \cdot 9H_2O$. The resultant material was dried and calcined at 400° C. for 3 hours following the first impregnation (to remove residual nitrates) and then calcined following the second impregnation at 800° C. for 5 hours to form the supported $La_{0.8}Mg_{0.2}FeO_3$. The formation of a perovskite phase on the alumina was substantiated by x-ray powder diffraction. The supported $La_{0.8}Mg_{0.2}FeO_3$ contained 30 wt % of the perovskite and had a surface area of 44 m²/g.

EXAMPLE 5

Preparation of $Pt/LaMnO_3$ supported on $Mg/Al_2O_3$.

25 g of γ-alumina beads were impregnated to 5 wt % Mg using magnesium nitrate. The material was then dried and calcined at 750° C. for 32 hours. The magnesium stabilized alumina was impregnated twice with a solution containing 6.9 g $La(NO_3)_3 \cdot 6H_2O$, 0.64 g $AgNO_3$ and 3.6 g $Mn(NO_3)_2$.

The resultant material was dried and calcined at 500° C. for 2 hours following the first impregnation (to remove residual nitrates) and then calcined following the second impregnation at 750° C. for 3 hours to form the supported $La_{0.8}Ag_{0.2}MnO_3$. The supported material was subsequently impregnated to 1800 ppm Pt using platinum ammine hydroxide, then dried and calcined at 550° C.

EXAMPLE 6

Preparation of $La_{0.8}Ag_{0.2}MnO_3$ supported on $Al_2O_3$.

25 g of γ-alumina beads were impregnated twice with a solution containing 6.9 g $La(NO_3)_3.6H_2O$, 0.64 g $AgNO_3$ and 3.6 g $Mn(NO_3)_2$, 5 g ethanol and log citric acid. The resultant material was dried under vacuum following the first impregnation (to remove the solution) and then calcined at 750° C. for 3 hours following the second impregnation to form the supported $La_{0.8}Ag_{0.2}MnO_3$. The formation of a perovskite phase on the alumina was substantiated by x-ray powder diffraction.

EXAMPLE 7

Figure 5:
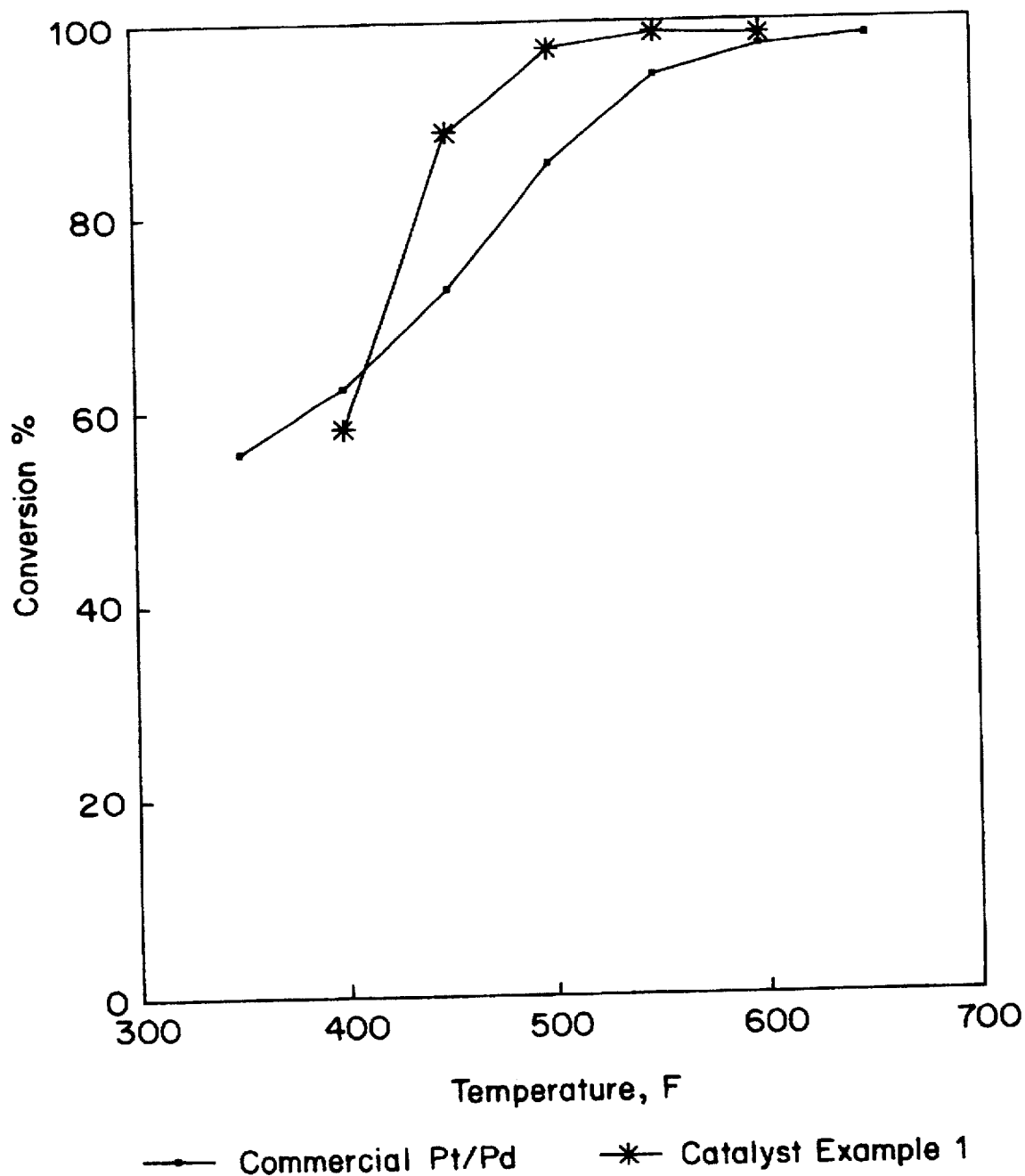
FIGS. 5 and 6 compare the conversion of ethanol versus temperature for the supported perovskite catalyst of Example 1 and a commercial catalyst containing Pt/Pd as described in Example 7.
Figure 6:
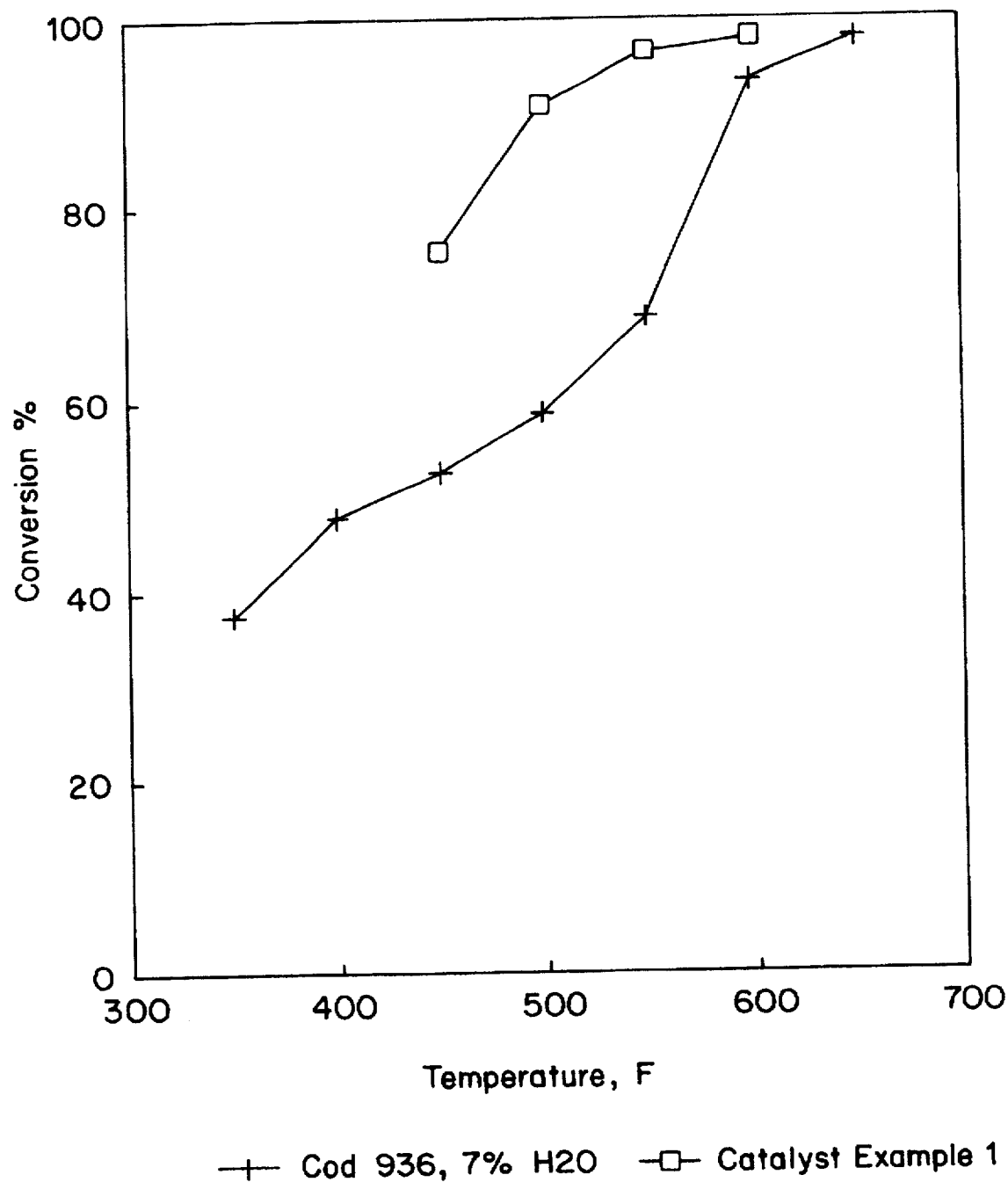

The ethanol oxidation performance of the supported perovskite catalyst prepared in Example 1 was determined and compared to the performance of a commercial catalyst containing Pt/Pd. Both catalysts were tested for ethanol oxidation under isothermal conditions (test conditions: flow rate: 12 l/min; 100 ppm ethanol; 15% $O_2$, 0% and 7% water, balance $N_2$). FIGS. 5 and 6 compare the conversion versus temperature for the two catalysts at a space velocity of 32,000 1/hr.

Although preferred embodiments of the invention are described herein in detail, it will be understood by those skilled in the art that variations may be made thereto without departing from the spirit of the invention or the scope of the appended claims.

What is claimed is:

1. A catalyst for oxidizing oxygen containing organic compounds to carbon dioxide and water consisting of a metal oxide support and a perovskite on the surface of said metal oxide support, wherein said metal oxide support is selected from the group consisting of aluminum oxide, magnesium oxide, titanium oxide, zirconium oxide, or a mixture thereof and wherein said perovskite has the formula $XYO_3$, wherein X is selected from the group consisting of La, Ce or yttrium, and Y is selected from the group consisting of manganese, iron, cobalt, nickel or chromium.

2. The catalyst according to claim 1, wherein said metal oxide support is a stabilized metal oxide support.

3. The catalyst according to claim 1, wherein said metal support is alumina.

4. The catalyst according to claim 1, wherein said metal oxide support is in the form of beads, powders, slurries, gels, monoliths, washcoats or extrudates.

5. The catalyst according to 4 wherein said metal oxide support is in the form of beads or extrudates.

6. The catalyst according to claim 2, wherein said stabilized metal oxide comprises a metal oxide having a layer of a different metal oxide on the surface thereof.

7. The catalyst according to claim 5, wherein the metal forming said layer of a different metal oxide is magnesium, iron, cobalt, nickel, manganese, zinc, titanium, copper, chromium, lanthanum, barium, calcium, strontium or silver.

8. The catalyst according to claim 1, further comprising at least one noble metal on the surface of said metal oxide support and/or on said perovskite.

9. The catalyst according to claim 8, wherein said noble metal is platinum or palladium.

10. The catalyst according to claim 1, wherein X is La.

11. The catalyst according to claim 10, wherein some of the La ions have been replaced and the perovskite has the formula $La_{1-x}A_xYO_3$ wherein x is about 0.75 or less, and A is silver or magnesium; and Y is manganese or iron.

12. The catalyst according to claim 11, wherein x is between 0.1 and 0.75.

* * * * *